US012583269B2

(12) United States Patent
    Yu

(10) Patent No.: US 12,583,269 B2
(45) Date of Patent: Mar. 24, 2026

(54) ACTIVE TIRE AUTO-LOCATION SYSTEMS FOR TIRE PRESSURE MONITOR SENSORS AND OPERATING METHOD

(71) Applicant: Chih-Wei Yu, Taipei City (TW)

(72) Inventor: Chih-Wei Yu, Taipei City (TW)

(73) Assignee: SYSGRATION LTD.

( * ) Notice: Subject to any disclaimer, the term of this patent is extended or adjusted under 35 U.S.C. 154(b) by 307 days.

(21) Appl. No.: 18/395,634

(22) Filed: Dec. 25, 2023

(65) Prior Publication Data

US 2024/0217280 A1     Jul. 4, 2024

(30) Foreign Application Priority Data

Dec. 29, 2022   (TW) ................................. 111150707

(51) Int. Cl.
    B60C 23/04          (2006.01)
(52) U.S. Cl.
    CPC ...... B60C 23/0489 (2013.01); B60C 23/0455 (2013.01); B60C 23/0479 (2013.01); B60C 23/0483 (2013.01); B60C 23/0488 (2013.01)
(58) Field of Classification Search
    CPC ............ B60C 23/0489; B60C 23/0455; B60C 23/0488; B60C 23/0416; B60C 23/0433; B60C 23/0486; B60C 23/0483; B60C 23/0401; B60C 23/0437; B60C 23/045; B60C 23/0479; B60C 2200/04; H04W 4/80; G16Y 40/10; G16Y 40/20; Y02D 30/70

See application file for complete search history.

(56) References Cited

U.S. PATENT DOCUMENTS

| | | | | |
|---|---|---|---|---|
| 2014/0184403 A1* | 7/2014 | Kosugi | ............... | B60C 23/0489 340/447 |
| 2016/0178481 A1* | 6/2016 | Fudulea | .............. | B60C 23/0481 701/33.9 |
| 2017/0066293 A1* | 3/2017 | Watanabe | ........... | B60C 23/0489 |
| 2019/0299725 A1* | 10/2019 | Maehara | ............. | B60C 23/0416 |
| 2024/0183930 A1* | 6/2024 | Obata | ................. | B60C 23/0416 |

* cited by examiner

*Primary Examiner* — Thomas M Hammond, III

(57) ABSTRACT

The present invention provides an Active Tire Auto-Location systems for tire pressure monitor sensors and an operating method. The system includes a host, wheel axle rotation detection devices and tire pressure monitor sensors. By allowing the wireless tire pressure detector to receive and compare the rotation information of a toothed ring from the wheel axle rotation detection device and the tire rotation information from the wireless tire pressure detector, each wireless tire pressure detector can identify which wheel axle rotation detection device that corresponds to it. At the same time, the tire position where each wireless tire pressure detector is situated can also be determined. Compared to prior art, it is still possible for the present invention to determine the tire position where each wireless tire pressure detector is situated, without the need for additional modification to the host, thus significantly reducing the inconvenience in replacing tire pressure monitor sensors.

10 Claims, 5 Drawing Sheets

ACTIVE TIRE AUTO-LOCATION SYSTEMS FOR TIRE PRESSURE MONITOR SENSORS AND OPERATING METHOD

BACKGROUND OF THE INVENTION

Fields of the Invention

The present invention relates to an Active Tire Auto-Location systems for tire pressure monitor sensors and operating method.

Descriptions of Related Art

With the evolution of time, in modern society, many domestic motor vehicles are equipped with tire pressure detection systems, which enable drivers to monitor the condition of their vehicle's tires in real-time and avoid safety-related issues, such as sudden tire bursts or driving with insufficient tire pressure. Common tire pressure detection systems consist of tire pressure detectors separately installed on the motor vehicle wheels and a host receiver inside the motor vehicle. Each tire pressure detector reads the air pressure or other preset parameters (such as tire temperature) inside the corresponding tire within a certain time frame and then transmits the collected results to the host.

In the industry, the host often differentiates between the tire pressure detectors installed on different wheels by programming the identification codes in the host. Instruments are employed to write the individual positions and serial numbers of all the tire pressure detectors into the host for identification and clarification. This method is stable and effective.

However, although this method is stable, if the tire pressure detector needs replacing or if the written information is incorrect, it usually requires returning to the factory or dealership for re-writing, which is extremely inconvenient for the user. Therefore, some manufacturers have developed tire pressure monitor sensors with wireless positioning systems, enabling the host to determine the tire locations where individual tire pressure detectors are situated through wireless positioning. This makes it more convenient for users to change the wheel location of different tire pressure detectors.

However, most wireless tire pressure detection systems with wireless positioning function on the market often require significant modifications to the host in order to enable the positioning feature. To precisely determine the position of tire pressure monitor sensors by the host within the vehicle, the host system needs additional modification and the incorporation of a new calculation method. This is inconvenient for users.

Therefore, if the situation described above could be optimized and improved, enabling the determination of the precise locations of individual tire pressure detectors without requiring extensive host modifications, it would increase the consumers' interest in purchasing tire pressure monitor sensors with positioning capabilities.

SUMMARY OF THE INVENTION

The primary objective of the present invention is to provide an Active Tire Auto-Location systems for tire pressure monitor sensors and an operating method. The system includes a host, wheel axle rotation detection devices and tire pressure monitor sensors. By allowing the wireless tire pressure detector to receive and compare the rotation information of a toothed ring (associated with the ABS wheel speed sensor) transmitted by the wheel axle rotation detection device from the host and the tire rotation information obtained by the wireless tire pressure detector itself, each wireless tire pressure detector can identify which wheel axle rotation detection device corresponds to it. At the same time, the tire position where each wireless tire pressure detector is situated can also be determined. Compared to prior art, it is still possible for the present invention to determine the tire position where each wireless tire pressure detector is situated, without the need for additional modifications to the host, thus significantly reducing the inconvenience in replacing tire pressure monitor sensors.

To achieve the above objectives and effects, the present invention provides an Active Tire Auto-Location systems for tire pressure monitor sensors, which includes a host, wheel axle rotation detection devices and tire pressure monitor sensors. The host includes a transceiver module and a memory module electrically connected to each other, and the memory module records information received by the transceiver module.

The wheel axle rotation detection devices are installed at each wheel and are electrically connected to the host. Each of the wheel axle rotation detection devices includes a toothed ring and a sensor electrically connected to each other. The sensor continuously transmits the rotation information of the toothed ring to the transceiver module, and tire positions where the individual wheel axle rotation detection devices are situated have been registered with the host.

The tire pressure monitor sensors are installed on the individual tires and establish wireless bidirectional connections with the host. Additionally, the tire pressure monitor sensors are installed in different positions from the wheel axle rotation detection devices, and each of the tire pressure monitor sensors includes a sensing module, a central control module, and a processing and calculating module electrically connected to each other. The sensing module can sense and communicate the tire rotation information to the central control module. The processing and calculating module can process and calculate the information obtained by the central control module.

When the wireless tire monitor sensor activates a positioning request, the wireless tire pressure monitor sensor first collects the tire rotation information at a set time or a set tire rotation angle. Then, the wireless tire pressure monitor sensor requests and obtains all the rotational information of the tooth ring and positional information of the wheel axle rotation detection device from the memory module of the host through the central control modules. Finally, through the processing and calculating module, the wireless tire pressure detector compares and calculates the information within the central control module to determine the wheel axle rotation detection device corresponding to itself and hence determine the vehicular tire location where it is situated.

To achieve the objectives and effects, the present invention also provides an operating method of an Active Tire Auto-Location systems for tire pressure monitor sensors. The method includes a connection transmission step, a synchronizing positioning step, a first information collection step, a second information collection step, a calculation step and a reporting step. In the connection transmission step, a host establishes wireless or electrical connections with a wheel axle rotation detection device and a wireless tire pressure detector, and the wheel axle rotation detection device continuously transmits rotation information of a corresponding tooth ring to a transceiver module of the host through a sensor.

In the synchronizing positioning step, after completing the connection transmission step, the host notifies the wireless tire pressure detector to activate a positioning request through a wireless bidirectional command, which, in turn, activates a sensing module to prepare for collection of tire rotation information.

In the first information collection step, after completing the synchronizing positioning step, the sensing module transmits a first tire rotation information to a central control module at a set first time or first tire rotation angle. Upon receiving the first tire rotation information, the central control module sends a first information request to a memory module of the host to cause the memory module to record and read a first rotation information of the toothed ring and a position information of the wheel axle rotation detection device and return them to the central control module of the wireless tire pressure detector.

In the second information collection step, after completing the first information collection step, the sensing module transmits a second tire rotation information to the central control module at a set second time or second tire rotation angle. Upon receiving the second tire rotation information, the central control module sends a second information request to the memory module of the host to cause the memory module to record and read a second rotation information of the toothed ring and return it to the central control module.

In the calculation step, after completing the second information collection step, the central control module, upon receiving the first rotation information of the toothed ring, the position information of the wheel axle rotation detection device and the second rotation information of the gear ring from the host, compares and calculates them with the first tire rotation information and the second tire rotation information using a processing and calculating module, such that the wireless tire pressure detector calculates in order to find out its corresponding wheel axle rotation detection device and determines its own tire position.

In the reporting step, after completing the calculation step, the wireless tire pressure detector reports a positioning result to the host, allowing the host to update the display or other actions.

In actual use, when the wireless tire pressure detector activates the positioning mode, the wireless tire pressure detector will record the tire rotation information at two specific times or angles when the tire rotates (such as the angles at the first time and the second time or the time points of the first angle and the second angle). After receiving this information, the wireless tire pressure detector will request the reading of the toothed ring rotation information (such as the angle or time) of the wheel axle rotation detection device from the host. By comparing the above-mentioned information, the wireless tire pressure detector calculates to determine which wheel axle rotation detection device corresponds to it. Since the positions of individual wheel axle rotation detection devices are registered in advance by the host (as known in the prior art), each of the tire pressure monitor sensors can calculate and determine its own tire position.

DETAILED DESCRIPTION OF THE PREFERRED EMBODIMENT

In conjunction with the accompanying drawings, the present invention is described in detail by way of embodiments. The drawings are intended for illustration and assistance in explaining the present invention, and thus may not necessarily represent the actual proportion and precise configuration for implementations of the present invention. Therefore, the scale and configuration relationship of the accompanying drawings should not limit the scope of the claims in the actual implementation.

Unless otherwise defined, all technical and scientific terms as used herein have the same meaning as understood by those skilled in the art of this application. The terms used in the specification of this application are used only to describe specific embodiments and are not intended to limit the scope of this application. The terms "including" and "having" and any variations thereof in the specification and claims of this application are intended to cover non-exclusive inclusion. The terms "first," "second," and the like in the specification and claims of this application or in the description of the accompanying drawings are used to distinguish different objects and not to describe a specific order.

Figure 1:
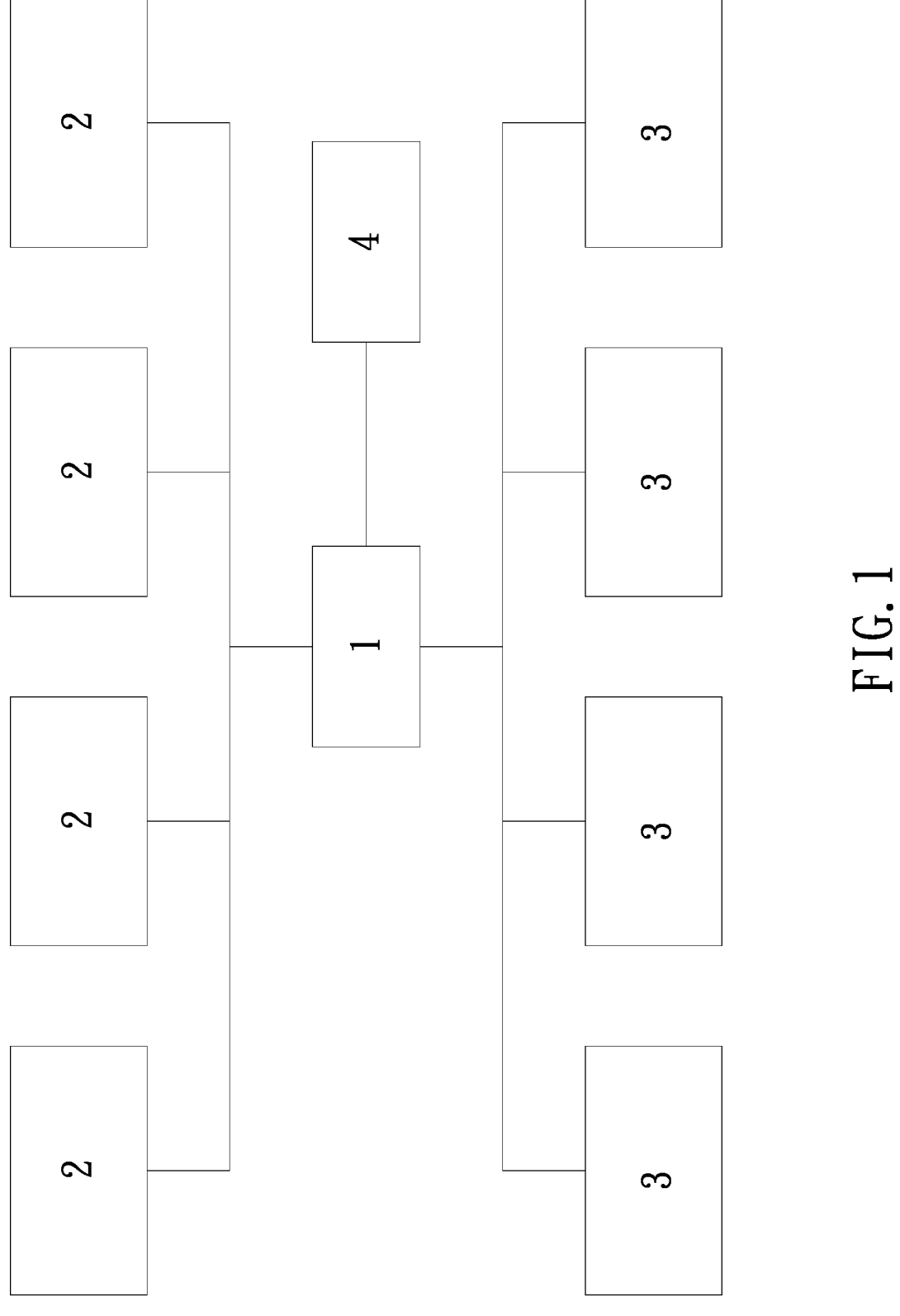
FIG. 1 is a block schematic view of the system of the present invention.
Figure 2:
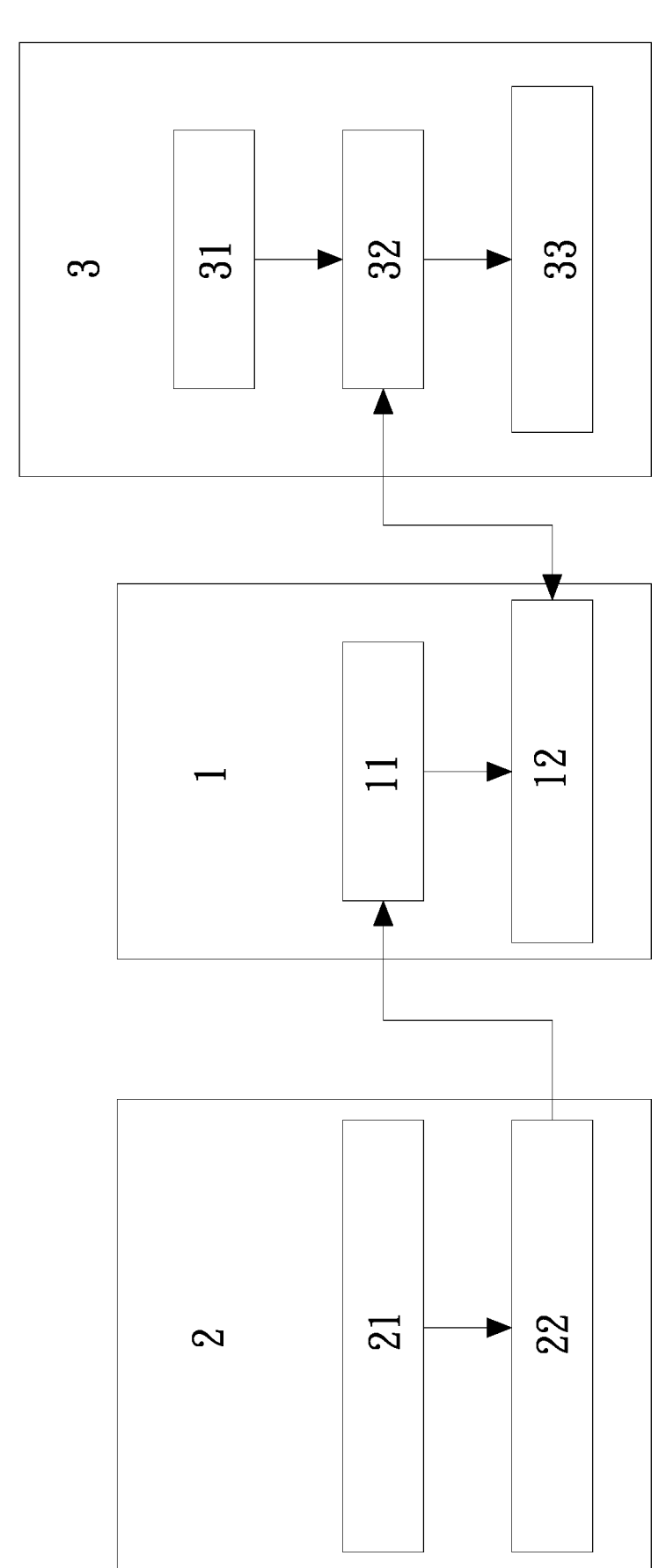
FIG. 2 is an architectural view of the system of the present invention.
Figure 3:
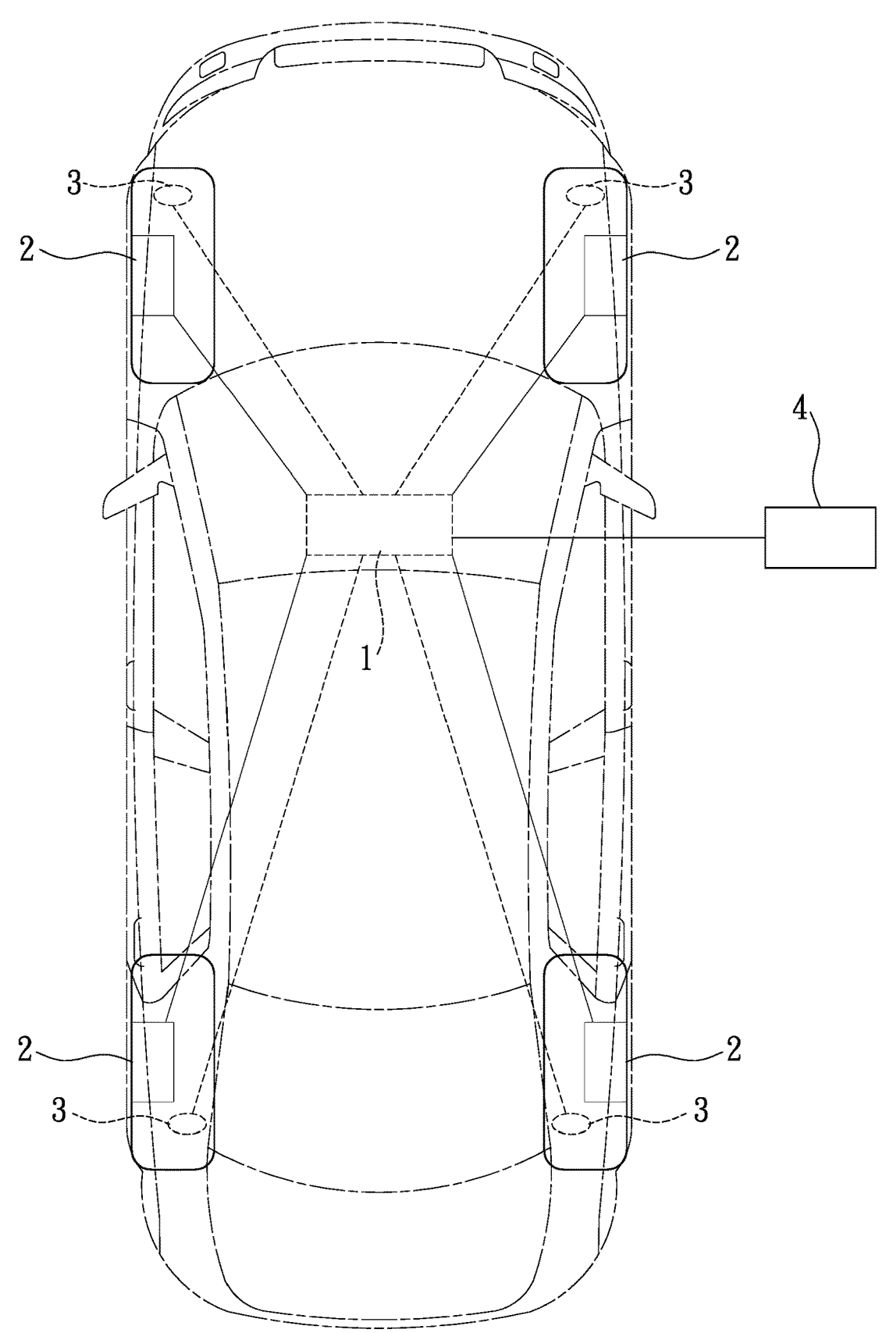
FIG. 3 is a schematic view of the actual use of the present invention.

As shown in FIGS. 1 to 3, the present invention provides an Active Tire Auto-Location systems for tire pressure monitor sensors, including a host 1, wheel axle rotation detection devices 2, and tire pressure monitor sensors 3. The host 1 includes a transceiver module 11 and a memory module 12 electrically connected to each other, and the memory module 12 records the information received by the transceiver module 11.

Furthermore, the wheel axle rotation detection devices 2 are installed on individual tires and electrically connected to the host 1. Each of the wheel axle rotation detection devices 2 includes a toothed ring 21 and a sensor 22 electrically connected to each other. The sensor 22 continuously transmits the rotation information of the toothed ring 21 to the transceiver module 11, and the tire positions where individual wheel axle rotation detection devices 2 are situated having been registered with the host 1.

Finally, the tire pressure monitor sensors 3 are installed on individual tires and establish wireless bidirectional connections with the host 1. The tire pressure monitor sensors 3 are installed in different positions from the wheel axle rotation detection devices 2. Each of the tire pressure monitor sensors 3 includes a sensing module 31, a central control module 32, and a processing and calculating module 33 electrically connected to each other. The sensing module 31 can sense and transmit the rotation information of the tire to the central control module 32. The processing and calculating module 33 can process and calculate the information obtained by the central control module 32.

Figure 5:
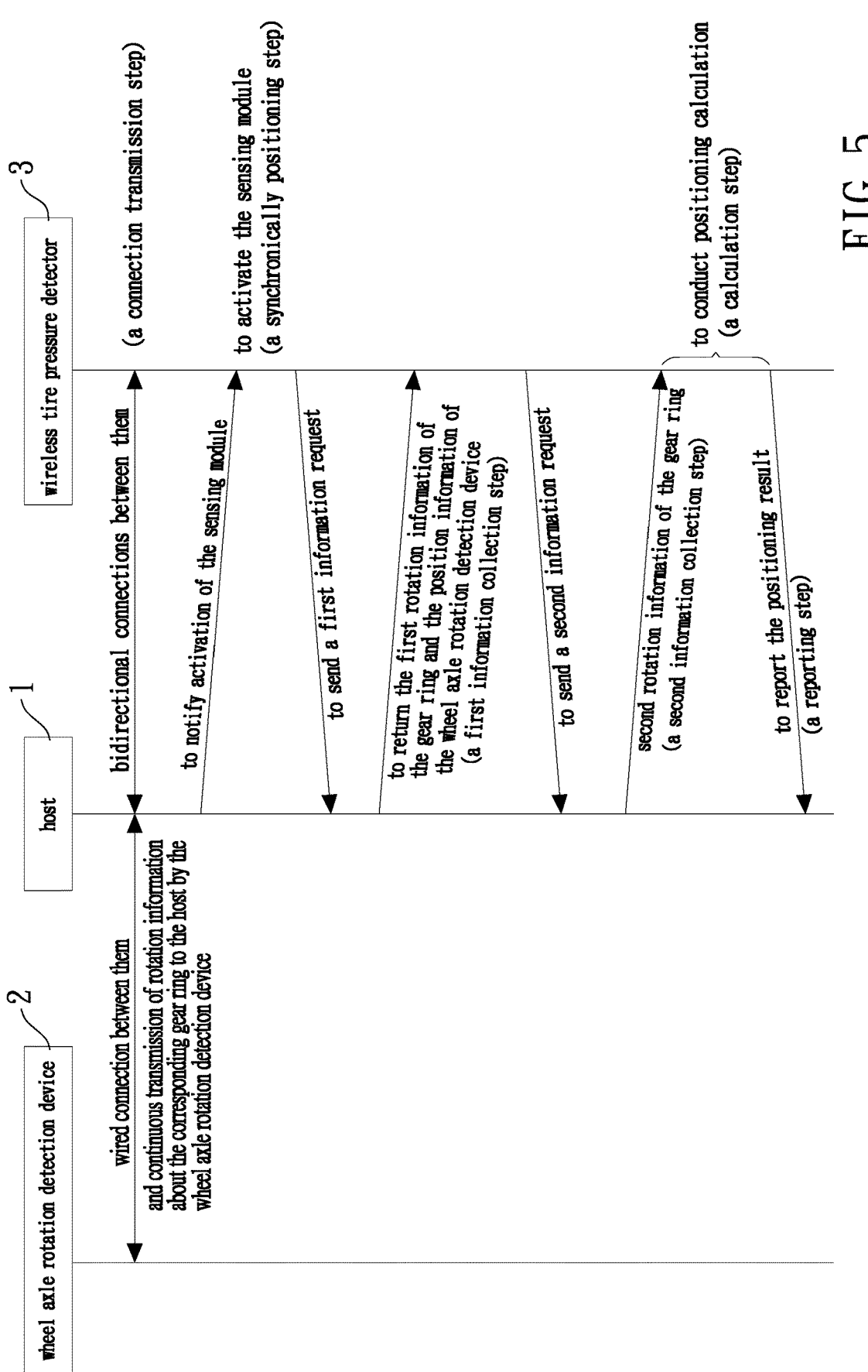
FIG. 5 is a schematic view of the timing of signal transmission in the present invention.

As shown in FIG. 5, when the tire pressure monitor sensors 3 activate the positioning mode, they first collect tire rotation information at a set time or a set tire rotation angle. Then, they request and obtain all the rotation information of the toothed rings 21 and the position information of the wheel axle rotation detection devices 2 from the memory module 12 of the host 1 through the central control modules 32. Finally, through the processing and calculating modules 33, the tire pressure monitor sensors 3 compare and calculate the information within the central control modules 32. The tire pressure monitor sensors 3 will find out the wheel axle rotation detection devices 2 corresponding to themselves and determine the tire positions where they are situated.

In the present invention, the rotation information of the toothed ring 21 mentioned above can be the rotational tooth count of the toothed ring 21 in a unit time or the rotation cycle of the toothed ring 21.

In the present invention, the wheel axle rotation detection device 2 mentioned above can be a tooth pulse sensing component of an anti-lock braking system.

Further, as shown in FIGS. 1 to 3, the present invention further includes an external controller 4. The external controller 4 is connected to the host 1 and can control the host 1 to activate or deactivate the positioning mode of the tire pressure monitor sensors 3.

Moreover, the aforementioned external controller 4 can be a control panel for the host 1, a wireless control tool, a software application, a wireless OTA (Over-The-Air programming) device, and a wireless remote control system.

The aforementioned technical features represent the primary aspects of the main embodiment of the present invention, corresponding to claim 1 of this application. They offer a comprehensive understanding of the objectives and implementations of the present invention. The additional technical features described in the remaining dependent claims are for the detailed description or additional technical features for claim 1 of this application and are not intended to limit the scope of claim 1 of this application. It should be understood that claim 1 of this application does not necessarily have to include the technical features described in the remaining dependent claims.

Figure 4:
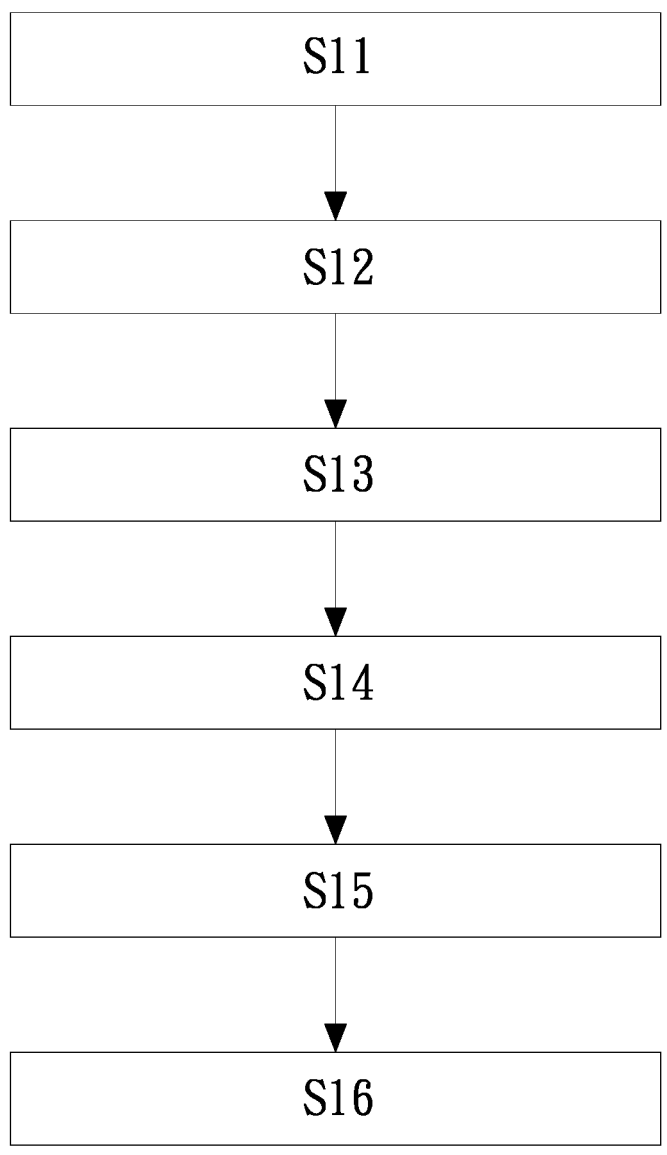
FIG. 4 is a flowchart of the method of the present invention.

As shown in FIG. 4, the present invention provides an operating method for the Active Tire Auto-Location systems of the above tire pressure monitor sensors. The method includes a connection transmission step S11, a synchronizing positioning step S12, a first information collection step S13, a second information collection step S14, a calculation step S15, and a reporting step S16. In the connection transmission step S11, the host 1 establishes wireless or electrical connections with the wheel axle rotation detection device 2 and the wireless tire pressure detector 3, and the wheel axle rotation detection device 2 continuously transmits the rotation information of its corresponding toothed ring 21 to the transceiver module 11 of the host 1 through the sensor 22.

In the synchronizing positioning step S12, after completing the connection transmission step S11, the host 1 notifies the wireless tire pressure detector 3 to activate the positioning mode through a wireless bidirectional command, which, in turn, activates the sensing module 31 to prepare for collection of tire rotation information.

Furthermore, in the first information collection step S13, after completing the synchronizing positioning step S12, the sensing module 31 transmits the first tire rotation information to the central control module 32 at a set first time or first tire rotation angle. Upon receiving the first tire rotation information, the central control module 32 sends a first information request to the memory module 12 of the host 1 to cause the memory module 12 to record and read the first rotation information of the toothed ring 21 and the position information of the wheel axle rotation detection device 2 and return them to the central control module 32 of the wireless tire pressure detector 3.

Next, in the second information collection step S14, after completing the first information collection step S13, the sensing module 31 transmits the second tire rotation information to the central control module 32 at a set second time or second tire rotation angle. Upon receiving the second tire rotation information, the central control module 32 sends a second information request to the memory module 12 of the host 1 to cause the memory module 12 to record and read the second rotation information of the gear ring 21 and return it to the central control module 32.

Then, in the calculation step S15, after completing the second information collection step S14, the central control module 32, upon receiving the first rotation information of the toothed ring 21, the position information of the wheel axle rotation detection device 2 and the second rotation information of the gear ring 21 from the host 1, compares and calculates them with the first tire rotation information and the second tire rotation information using the processing and calculating module 33. The wireless tire pressure detector 3 calculates to find out its corresponding wheel axle rotation detection device 2 and determines its own tire position.

Finally, in the reporting step S16, after completing the calculation step S15, the wireless tire pressure detector 3 reports the positioning result to the host 1, allowing the host 1 to update the display or other actions.

In the above operating method, the rotation information of the gear ring 21 mentioned above can be the rotational tooth count of the toothed ring 21 in a unit time or the rotation cycle of the toothed ring 21.

In the above operating method, the wheel axle rotation detection device 2 can be a tooth pulse sensing component of an anti-lock braking system.

In the above operating method, the synchronizing positioning step S12 further involves an external controller 4 connected to the host 1 and can control the host 1 to activate or deactivate the positioning mode of the wireless tire pressure detector 3.

Furthermore, the external controller 4 mentioned above can be a control panel for the host 1, a wireless control tool, a software application, a wireless OTA (Over-The-Air programming) device, and a wireless remote control system.

In actual use, as shown in FIGS. 1 to 5, when the wireless tire pressure detector 3 activates the positioning mode, the wireless tire pressure detector 3 will record the tire rotation information at two specific times or angles when the tire rotates (such as the angles at the first time and the second time or the time points of the first angle and the second angle). After receiving this information, the wireless tire pressure detector 3 will request the reading of the toothed ring rotation information (such as the angle or time) of the wheel axle rotation detection device 2 from the host 1. By comparing this information, the wireless tire pressure detector 3 calculates to determine which wheel axle rotation detection device 2 corresponds to it. Since the positions of individual wheel axle rotation detection devices 2 are registered in advance by the host 1 (as known in the prior art), each of the tire pressure monitor sensors 3 can calculate and determine its own tire position.

What is claimed is:

1. An Active Tire Auto-Location systems for tire pressure monitor sensors, comprising a host, wheel axle rotation detection devices and tire pressure monitor sensors, wherein:

the host includes a transceiver module and a memory module electrically connected to each other, and the memory module records information received by the transceiver module;

the wheel axle rotation detection devices are installed on individual tires and electrically connected to the host and each includes a toothed ring and a sensor electrically connected to each other, wherein the sensor continuously transmits rotation information of the toothed ring to the transceiver module, and tire positions where the individual wheel axle rotation detection devices are situated have been registered with the host;

the tire pressure monitor sensors are installed on the individual tires and establish wireless bidirectional connections with the host, wherein (i) the tire pressure monitor sensors are installed in different positions from the wheel axle rotation detection devices, (ii) each of the tire pressure monitor sensors includes a sensing module, a central control module, and a processing and calculating module electrically connected to each other, (iii) the sensing module is configured to sense and transmit a tire rotation information to the central control module, and (iv) the processing and calculating module is configured to process and calculate the information obtained by the central control module;

when the wireless tire pressure detector activates a positioning mode, the wireless tire pressure detector first collects tire rotation information at a set time or a set tire rotation angle; then, the wireless tire pressure detector requests and obtains all the rotation information of the toothed ring and position information of the wheel axle rotation detection device from the memory module of the host through the central control modules; and finally, through the processing and calculating module, the wireless tire pressure detector compares and calculates the information within the central control module to find out the wheel axle rotation detection device corresponding to itself and determine a tire position where it is situated.

2. The Active Tire Auto-Location systems for tire pressure monitor sensors as claimed in claim 1, wherein the rotation information of the toothed ring is a rotational tooth count of the toothed ring in a unit time or a rotation cycle of the toothed ring.

3. The Active Tire Auto-Location systems for tire pressure monitor sensors as claimed in claim 1, wherein the wheel axle rotation detection device is a tooth pulse sensing component of an anti-lock braking system.

4. The Active Tire Auto-Location systems for tire pressure monitor sensors as claimed in claim 1, further comprising an external controller connected to the host and configured to control the host.

5. The Active Tire Auto-Location systems for tire pressure monitor sensors as claimed in claim 4, wherein the external controller is a control panel for the host, a wireless control tool, a software application, a wireless OTA (Over-The-Air programming) device, and a wireless remote control system.

6. An operating method of an Active Tire Auto-Location systems for tire pressure monitor sensors, the method comprising:

a connection transmission step, in which a host establishes wireless or electrical connections with a wheel axle rotation detection device and a wireless tire pressure detector, and the wheel axle rotation detection device continuously transmits a rotation information of a corresponding toothed ring to a transceiver module of the host through a sensor;

a synchronizing positioning step, in which after completing the connection transmission step, the host notifies the wireless tire pressure detector to activate a positioning mode through a wireless bidirectional command, which, in turn, activates a sensing module to prepare for collection of tire rotation information;

a first information collection step, in which after completing the synchronizing positioning step, the sensing module transmits a first tire rotation information to a central control module at a set first time or first tire rotation angle; upon receiving the first tire rotation information, the central control module sends a first information request to a memory module of the host to cause the memory module to record and read a first rotation information of the toothed ring and a position information of the wheel axle rotation detection device and return them to the central control module of the wireless tire pressure detector;

a second information collection step, in which after completing the first information collection step, the sensing module transmits a second tire rotation information to the central control module at a set second time or second tire rotation angle; upon receiving the second tire rotation information, the central control module sends a second information request to the memory module of the host to cause the memory module to record and read a second rotation information of the toothed ring and return it to the central control module;

a calculation step, in which after completing the second information collection step, the central control module, upon receiving the first rotation information of the toothed ring, the position information of the wheel axle rotation detection device and the second rotation information of the toothed ring from the host, compares and calculates them with the first tire rotation information and the second tire rotation information using a processing and calculating module, such that the wireless tire pressure detector calculates to find out its corresponding wheel axle rotation detection device and determines its own tire position; and a reporting step, in which after completing the calculation step, the wireless tire pressure detector reports a positioning result to the host.

7. The operating method of the Active Tire Auto-Location systems for tire pressure monitor sensors as claimed in claim 6, wherein each of the first rotation information of the toothed ring and the second rotation information of the toothed ring is a rotational tooth count of the tooth ring in a unit time or a rotation cycle of the tooth ring.

8. The operating method of the Active Tire Auto-Location systems for tire pressure monitor sensors as claimed in claim 6, wherein the wheel axle rotation detection device is a tooth pulse sensing component of an anti-lock braking system.

9. The operating method of the Active Tire Auto-Location systems for tire pressure monitor sensors as claimed in claim 6, wherein the synchronizing positioning step further includes using an external controller connected to the host and configured to control the host.

10. The operating method of the Active Tire Auto-Location systems for tire pressure monitor sensors as claimed in claim 9, wherein the external controller is a control panel for the host, a wireless control tool, a software application, a wireless OTA (Over-The-Air programming) device, and a wireless remote control system.

* * * * *